Oct. 30, 1928.
T. LEVOZ
1,689,734
PROCESS OF DIRECT REDUCTION OF IRON ORES
Filed Feb. 16, 1924
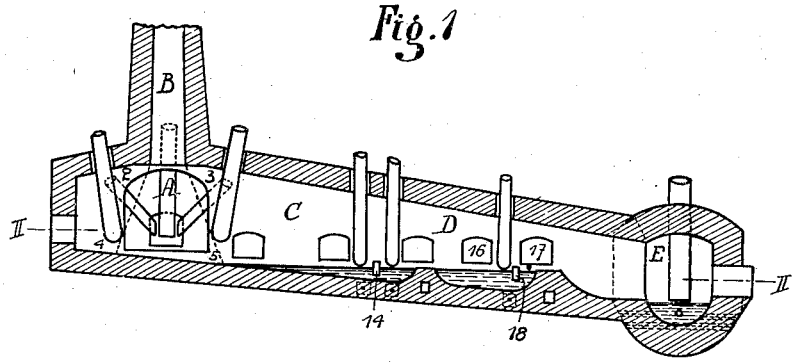
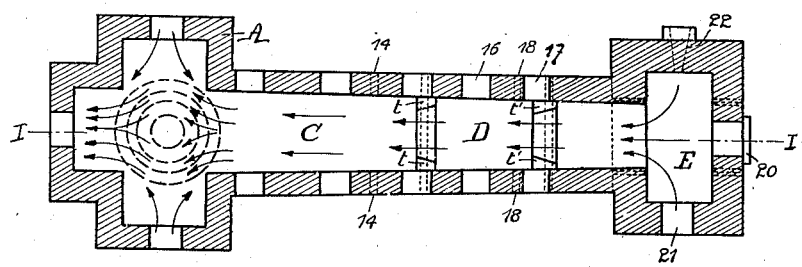

Patented Oct. 30, 1928.

1,689,734

UNITED STATES PATENT OFFICE.

TOUSSAINT LEVOZ, OF HEER, BELGIUM, ASSIGNOR TO N. V. HANDELMAATSCHAPPIJ FERIRON, OF ROTTERDAM, NETHERLANDS.

PROCESS OF DIRECT REDUCTION OF IRON ORES.

Application filed February 16, 1924, Serial No. 693,359, and in Belgium February 1, 1923.

My present invention has for its object a process for the direct manufacture of iron from ore by mixing the ore with the necessary reducers and fluxes so as to directly produce molten iron of sufficient fluidity to freely flow under atmospheric conditions.

According to the present invention, the ore is charged into the furnace with the usual fluxes of alkaline character comprising sodium, fluorine, borax, cryolite, potassium bichromate, and potassium, usually in the form of a silicid or silicate these having a point of fusion less than 1000° C. and causing the formation of slag at temperatures considerably below the fusion point for iron and iron oxides, and in addition adding a quantity of carbon just sufficient for the reduction of the oxide present, and a definite calculated amount of aluminum silicate.

The heat necessary for fusing the charge is not produced by the combustion of carbon introduced with the charge as is the case in blast furnaces, but rather by external heating means such as pulverized coal, the injection of heavy oils, or the use of electric arcs. Thus the metal obtained contains a relatively high quantity of silicon and manganese and a small quantity of carbon so that the decarbonization reactions are not too violent and the final reduction of silicon and manganese will produce enough heat to maintain the fluidity of the pure iron bath.

The compound carbide of iron, silicon and manganese obtained is subjected to an additional heating and is kept fluid by a liquid covering relatively high in aluminum oxide. Contact with the carbide of iron, silicon and manganese dissociates the aluminum silicates present in the liquid cover. The aluminum oxide is reduced by the iron carbide to aluminum, which combines with the metal in the bath to form an alloy of iron, silicon, aluminum and manganese containing little or no carbon.

Following the addition of a calculated amount of hematite or magnetite ores, or preferably of iron oxides, simultaneous oxidation of the silicon, manganese, and aluminum occurs. These reactions are of an exothermic order, developing sufficient heat in the melting zone to produce the desired high temperatures for melting unreduced iron oxides surrounding the grains of ferrite, and to maintain the fluidity of the pure iron thus permitting it to be freely poured under atmospheric conditions.

The accompanying drawings represent a type of furnace in which the process disclosed may be carried out.

Figure 1 is a vertical section on the longitudinal axis of an electrically heated furnace comprising a melting chamber and three additional chambers for carrying out the steps of the process. The section is on the line 1—1 of Figure 2.

Figure 2 is a section on the line 2—2 of Figure 1.

The crude iron ore is mixed before charging with reducing carbon, a calculated amount of silicon and aluminum, and fluxes of melting point below 1000° C. so that a bath is formed at temperatures considerably less than the fusing point of iron and iron oxide by the application of external heat. It is advantageous, although not necessary, to crush the raw material before mixing, and to use binders for forming briquettes of a size proportionate to the size of the melting chamber. These briquettes may be perforated to increase the amount of surface exposed to the gases and heat.

If desired, the iron ore may be mixed with manganese ore to produce the desired quality or composition in the resulting iron, but the presence of manganese is not necesary for the proper functioning of the method described.

The charge proportions naturally vary in accordance with the nature of the ore, but in all cases the carbon introduced into the briquettes is used only as a reducer. The briquettes are brought to the desired temperature by means of external heat such as pulverized coal, the injection of heavy oils, or the electric arc.

The briquettes are fed into melting chamber A through a slightly conical stack B. They are subjected to heat produced in whichever chamber A, C, D or E constitutes the furnace in the present case. This heat, produced electrically in the illustrated embodiment, but which may be produced by any other means, spreads throughout the furnace in the path roughly indicated by the arrows of Figure 2. The ore in the charging cone represented by 2, 3, 4, 5, is rapidly attacked due to the presence of the fluxes of low temperature. These fluxes react with the silicates in the mass and in addition free the silicon by subsequent reduction of the silicate itself, on account of the presence of sodium fluo-silicates; the silicon then reacts with the iron when the latter is reduced.

The slag formed separates completely from the iron oxide and the latter is then easily reduced by contact with the reducing carbon. The resulting carbide of iron flows with the bath to the bottom of the inclined base leading into chamber C and slowly separates from the slag floating on the surface.

The average temperature in the furnace, which is about 1700° C., is brought up to about 1900° C. in the chamber C. Under the influence of this influx of supplementary heat and because of contact with the carbide of iron, silicon, and when present, manganese, the slag, which is composed of aluminum silicate, dissociates; the aluminum oxide formed is reduced to aluminum by the carbon of the iron carbide. The formation of an alloy of iron, silicon, aluminum and manganese results containing little or no carbon.

The elimination of carbon, combined with the iron, which is never present in excess is not therefore completed during the final oxidation normally occurring in all the usual well known processes, which possess the disadvantages of causing violent reactions and resulting boiling of the bath, and of cooling the iron at the very moment when it should not be cooled, since the oxidation of carbon is an endothermic reaction when the oxidizing agent is an oxide like iron oxide. On the contrary, the final reactions in the described methods are exothermic reactions of oxidation which permit free flow of the liquid iron.

The slag covering the molten mass in chamber C permits decarbonization of iron without oxidation of silicon. The latter may be produced before the carbon oxidation if elimination appears desirable by means of oxidation. At the same time, the covering of slag shields the iron from the air, thus preventing oxidation of the pure iron. The iron cannot combine with the slag; the separated slag is evacuated through exits 14 in the side walls.

When the molten metal rises in the chamber C, a charge of hematite, magnetite, or iron oxide, together with low fusing point fluxes such as were originally mixed with the ore, is introduced through doors 16 and 17. Because of the high temperature of the furnace, a liquid slag rapidly forms in the lower portion of the chamber D.

When the chamber C is full conical openings $t$ are opened to permit passage of the molten mass from chamber C into chamber D.

As the flowing metal contains practically no carbon, the resulting endothermic reaction due to oxidation of carbon is very feeble. On the other hand, the oxidation of silicon, aluminum, and manganese in the molten mass produces exothermic reactions insuring the necessary temperatures for maintaining fluidity of the pure iron. The refining is quickly completed. The floating slag is removed by exits 18 as rapidly as the molten metal rises in chamber D. When chamber C is almost empty, ports $t$ are opened, the necessary additions for giving the iron the desired final composition are inserted in chamber E, and the ports 18 and $t$ are then opened to admit the iron into the chamber E. The impurities floating on the surface are removed through ports 20 and 21 and the metal then freely flows out through outlets 22.

The last operation is easily completed because of the fluidity induced by the excess of heat resulting from the oxidation of aluminum, silicon and manganese. The flowing metal is very homogeneous and does not contain occluded gases such as result when the last step is the reduction of carbon, such reduction being quite violent and resulting in boiling of the molten mass. In addition, because of the endothermic character of this reaction, it was often found necessary to reheat the mass in order to make the iron less pasty and to permit its free flow.

In cases where the ore requires supplementary treatment for dephosphorization or desulphurization, an intermediate chamber must be provided in which the necessary materials for effecting the operation in question may be added.

The lining of the different chambers must naturally be in accordance with the operations effected in each. Thus, in the described embodiment, chambers A, C and D have an aluminum-silico-graphite-lining; chamber E is lined with dolomite or magnesium. These linings are not attacked by the mixtures contained in the chambers. It is essential, in order to obtain pure iron, to prevent the mixing of any foreign substance with the slag and the metal.

Having thus described my invention, I claim:

1. In the direct manufacture of iron from ore, the steps of forming a charge comprising iron ore, reducing carbon, oxides of alloy metals such as Si and Mn, and a low melting point aluminiferous flux; subjecting the charge to a comparatively low temperature to produce a low carbon ferro alloy, and a covering slag; raising the temperature to reduce the carbon content of the alloy by interaction of the carbon with the oxidized aluminum in said slag; and then reducing the components other than iron of the alloy by means of an oxidizing agent.

2. In the direct manufacture of iron from ore, the steps of forming charge briquettes comprising iron ore, reducing carbon, oxides of alloy metals such as Si and Mn, and a low melting point aluminiferous flux; subjecting the charge to a comparatively low temperature to produce a low carbon ferro alloy, and a covering slag; raising the temperature to reduce the carbon content of the alloy by interaction of the carbon with the oxidized aluminum in said slag; and then reducing the components other than iron of the alloy by means of an oxidizing agent.

In testimony whereof I affix my signature.

TOUSSAINT LEVOZ.